United States Patent [19]

Glans et al.

[11] Patent Number: 4,755,412
[45] Date of Patent: Jul. 5, 1988

[54] PACKING LAMINATE IN THE FORM OF A WEB AND A METHOD FOR MANUFACTURING THE SAME

[75] Inventors: Jan-Erik Glans, Kävlinge; Sven G. Nilsson, Malmö, both of Sweden

[73] Assignee: Tetra Pak International AB, Lund, Sweden

[21] Appl. No.: 438,649

[22] Filed: Nov. 3, 1982

[30] Foreign Application Priority Data

Nov. 5, 1981 [SE] Sweden .................................. 8106547

[51] Int. Cl.$^4$ ................................................. B32B 3/04
[52] U.S. Cl. ............................................ 428/121; 428/36; 428/124; 428/127; 428/129; 428/161; 428/163; 428/165; 428/167; 428/172
[58] Field of Search .............. 428/36, 121, 124, 127, 428/129, 161, 163, 165, 167, 172; 229/39 R, 21, 48 R, 48 SA

[56] References Cited

U.S. PATENT DOCUMENTS 4,401,004 8/1983 Glans ................................ 83/875

FOREIGN PATENT DOCUMENTS 8000890-7 10/1983 Sweden .
2057967 9/1980 United Kingdom .

Primary Examiner—Marion C. McCamish
Attorney, Agent, or Firm—Burns, Doane, Swecker & Mathis

[57] ABSTRACT

A packing laminate in the form of a web with thinned edge zones is manufactured by providing a wide raw material web simultaneously with a number of parallel thinned areas. The raw material web is then covered with layers of thermoplastic material, whereupon it is divided into webs of the desired width by means of cuts placed asymmetrically in the said thickness--reduced areas. As a result the finished laminate webs obtain thermoplastic-covered, thickness-reduced edge zones of different widths.

11 Claims, 1 Drawing Sheet

PACKING LAMINATE IN THE FORM OF A WEB AND A METHOD FOR MANUFACTURING THE SAME

The present invention relates to a method for manufacturing a packing laminate in the form of a web by processing and dividing up a raw material web which comprises a layer of a stiffening material.

The invention also relates to a packing laminate in the form of a web comprising a carrier layer of stiffening material and at least one layer of thermoplastic material laminated to the same.

Packing containers of the non-returnable type for the packaging of e.g. milk and other liquid dairy products are manufactured from laminated packing material which comprises a carrier layer of relatively stiff material, e.g. paper, which, at least on the side which is intended to be in contact with the contents, is covered with a liquid-tight, preferably thermoplastic material, e.g. polyethylene. Beside serving as a material conferring imperviousness, the thermoplastic layer is also used for making possible the heat-sealing of the laminate. For this reason it is often advantageous if the opposite side, that is to say the outer side, of the carrier layer is also covered with a thermoplastic material. When the packing laminate is converted into packing containers, these are formed in such a manner, by folding and sealing of the laminate, that packing containers of the desired shape are obtained. It is of the greatest importance that the seals, which unavoidably must be present on the finished packing container, should be completely impervious to liquid. This is particularly difficult to achieve if seals of the inside-to-outside type are used, since the lower packing laminate edge, that is to say the edge facing towards the inside of the packing container, will then come into contact with the contents not only with the thermoplastic-covered surface, but also with the cut edge itself where the carrier layer is exposed. In the case of a carrier layer of the fibrous type, this will gradually absorb contents, which detrimentally affects the tightness and the durability of the package. In order to prevent this, either a separate liquid-tight strip has been placed over the exposed cut edge on the inside of the seal up to now, or else the internal edge zone of the material is doubled so that the inner thermoplastic layer extends around the edge and prevents contact between the contents and the carrier layer. The latter method is generally preferred, since in this case no separate strip need be used. However, the packing laminate has to be prepared for this method by a certain thinning of the edge which is to be folded, since other wise the multiple material thickness causes the sealing zone to become thick and unwieldy.

The thinning of the edge on the packing laminate web which is to be folded has been achieved up to now as a last stage in the manufacture of the laminate web. After the carrier layer has been provided with the different layers of thermoplastic, and possibly other, material which are intended to constitute the finished laminate, and has been cut to an appropriate width, the thinning of the edge in question is performed by causing the web to pass a grinding wheel or a cylindrical cutter which along a longitudinal edge zone grinds or cuts away a portion of the carrier layer together with the outside thermoplastic layer. Since the cutting away is taking place only in the edge region of the material web, it is difficult to carry out the operation with sufficient precision, since the edge region tends to give way or move in lateral direction under the effect of the cutting tool. The operation, moreover, takes a long time, since the speed of the material web has to be kept relatively low owing to the instability of the edge. In order to prevent any dust, which is formed in connection with the cutting from following the material web and eventually settling in the packages, some form of cleaning of the material web also has to be performed before it is converted to finished packing containers.

It is an object of the present invention to provide a method for manufacturing a packing laminate in the form of a web of the type described, which method is not subject to the aforementioned disadvantages.

It is a further object of the present invention to provide a method for manufacturing a packing laminate in the form of a web with reduced edge thickness, which method can be carried out with good precision even at high web speed.

It is a further object of the present invention to provide a high-capacity method for manufacturing a packing laminate in the form of a web with cut edges which does not require cleaning prior to conversion to packing containers.

These and other objects have been achieved in accordance with the invention in a method for manufacturing a packing laminate through reduction of the thickness of the raw material web within longitudinal zones, located regularly spaced over the width of the raw material web, by cutting away a portion of the stiffening layer, whereupon the raw material web is divided into individual, narrower packing material webs by means of cuts in the zones.

By carrying out the thinning of the material while it is in the form of a wide raw material web and only thereafter dividing the raw material web into individual packing laminate webs, an appreciably higher capacity is achieved than by using any of the previously known methods, since firstly the raw material web can be processed simultaneously by a number of cutting tools arranged side by side over the width and, since secondly it can be advanced at an appreciably higher speed, as the processing is taking place largerly at a distance from the unstable edge zones.

It is an object of the present invention, moreover, to provide a packing laminate in the form of a web of the aforementioned type, which packing laminate is not subject to the disadvantages exemplified above.

It is a further object of the present invention, therefore, to provide a packing laminate in the form of a web of the aforementioned type, which laminate has edge zones of such a shape that they can be used to produce seals of good liquid-tightness.

It is a further object of the present invention, moreover, to provide a packing laminate in the form of a web whose edge zones are shaped so that jointly they make it possible to produce seals of optimum properties insofar as tightness, suppleness and appearance are concerned.

These and other objects have been achieved in accordance with the invention in packing laminate in the form of a web of the type described has been given previously, wherein the laminate web along its longitudinal edges is provided with edge zones wherein the thickness of the carrier layer is reduced, the said edge zones as well as the remaining parts of the carrier layer are covered by the thermoplastic layer.

A preferred embodiment of the method as well as of the packing laminate in accordance with the invention will now be described in detail with special reference to the attached schematic drawing which on an enlarged scale illustrates the particulars necessary for the understanding of the invention.

Figure 1:
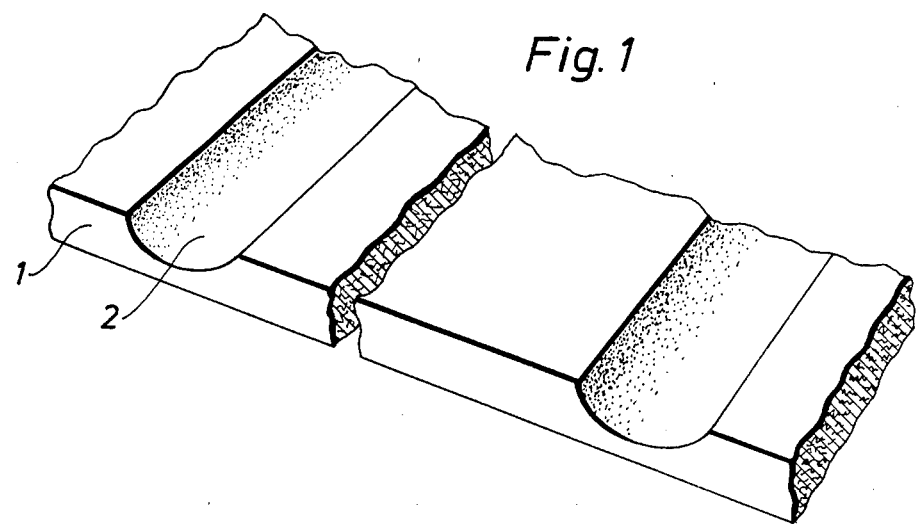
FIG. 1 shows in perspective presentation a portion of a raw material web during the manufacture of the packing laminate in accordance with the method of the invention.

In FIG. 1 is shown in perspective view a portion of a raw material web which has been provided with longitudinal zones of reduced thickness in accordance with the invention. In this stage of the manufacture the raw material web consists exclusively of a carrier layer 1 of stiffening material, generally paper. In accordance with the method of the invention, the thickness of the carrier layer 1 has been reduced within longitudinal zones 2 located regularly spaced over the width of the raw material web. This is done appropriately with the help of a number of rotating cylindrical cutters which during the manufacture of the material are arranged so as to be in contact with the raw material web passing by in such a manner that by means of the active part of their periphery they cut away a strip of the desired thickness from one side of the raw material web. The method suitable for achieving this as well as the appropriate arrangements are described in some detail in Swedish patent application No. 8000890-7, to which reference is made, so that a more detailed desdescription can be dispensed with.

Figure 2:
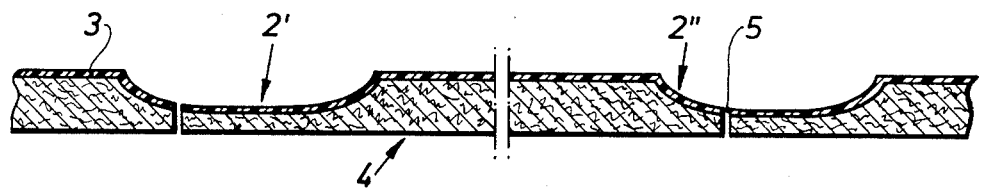
FIG. 2 is a cross-section through a raw material web in accordance with FIG. 1 during a later phase of the manufacture.

In FIG. 2 the raw material web in accordance with FIG. 1 is shown in section during a later phase of the course of manufacture. After the zones 2 have been produced, through a reduction in thickness of the carrier layer 1 of the raw material web, the carrier layer is provided with a thin layer 3 of homogeneous thermoplastic material, preferably polyethylene. The thermoplastic is extruded onto the raw material web after the zones 2 have been produced, and is laminated to the carrier layer 1 by allowing the latter, after it has passed an extruder die, to pass between two rollers in contact with one another which press the still partly soft thermoplastic 3 into the surface of the carrier layer 1 so that a complete lamination is achieved. To ensure a true contact between the thermoplastic layer 3 and the carrier layer 1, also in the zones 2, it is appropriate for one of the two rollers to consist of rubber or some other flexible material.

After the lamination has been complete, and the carrier layer possibly has also been provided with a further thermoplastic layer on its opposite, plane side, the raw material web is divided into individual, narrower packing laminate webs 4 with the help of longitudinal cuts 5 in the thickness-reduced zones 2. As is evident from FIG. 2, the cuts 5 are placed asymmetrically in the zones and more particularly in such a manner that each cut 5 divides a thickness-reduced zone 2 into a wider and a narrower edge zone 2' and 2" respectively. In fact the cuts 5 are located so that the two edge zones 2', 2" are given a definite mutual width ratio. As can be seen in particular from FIG. 2, each of the thickness-reduced zones 2 comprises a centrally situated, substantially plane area of minimum thickness. This area takes up approximately half the total width of the zone 2. On either side of this plane area of minimum thickness there are two gradual transition areas, each of which taking up approximately ¼ of the total width of the reduced zone 2. Now each of the thickness-reduced zones 2 is divided with the help of cuts 5 in such a manner that the wider edge zone 2', beside a gradual transition area, also comprises the greater part of, or the whole of, the area of minimum thickness, whilst the narrower edge zone 2" only comprises one of the areas where the material thickness gradually diminishes. As a result the two thickness-reduced edge zones 2' and 2" will be given a mutual width ratio which substantially comes to 3:1, and at all events is between 5:1 and 3:2.

The wider, thickness-reduced edge zone 2' thus comprises the greater part of, or the whole of, the area within which the laminate thickness is smallest. Within this area the thickness of the carrier layer 1 has been reduced to between half and ⅓ of the original thickness and the laminate can be doubled in this area, therefore, without the thickness so produced exceeding the original thickness of the laminate, which is a great advantage.

Figure 3:
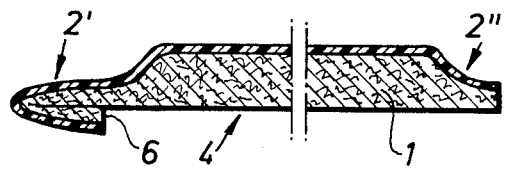
FIG. 3 is a cross-section through a packing material web with a folded over edge according to the invention.

The doubling of a wider edge zone 2' of an individual packing laminate web 4 is illustrated in FIG. 3. It can be seen from the figure how the longitudinal edge is folded over 180° along a folding line whose location substantially coincides with the center of the area in the wider edge zone 2' wherein the material thickness is smallest. The original outer cut edge 6 of the material web 4 is thus at the same level (but at the opposite side of the laminate) as the transition between the central area of the edge zone 2' of minimum thickness and the transition zone to full material thickness. The edge zone of the packing laminate has been folded over 180° in such a manner that the thermoplastic layer, which afterwards will be facing towards the interior of the packing container, extends around the material edge. The folded part of the edge zone can be sealed to the outer side of the packing laminate with the help of the thermoplastic layer (not shown) which usually covers the outside of the laminate or by means of glue.

Figure 4:
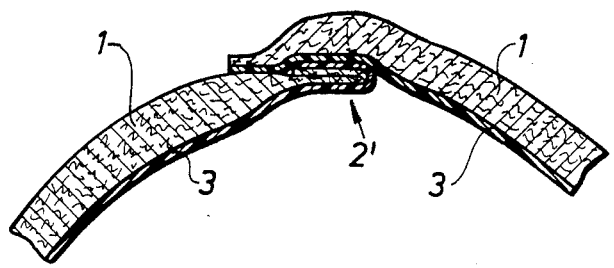
FIG. 4 is a cross-section through an overlap seal produced with a packing laminate according to the invention.

In FIG. 4 is shown how the packing material web according to FIG. 3 has been formed to a tube (only partly shown), its two edges having been joined together in an overlap seal. The folded over edge zone 2' of the packing material web is situated here inside the edge zone 2" (that is to say inside the tube or eventually the packing container), so that the whole of the surface of the packing laminate which comes into contact with the contents present inside the packing container will be covered by the thermoplastic material layer 3 of the laminate. The two parts of the thermoplastic layer 3 are sealed in liquid-tight manner to one another within that area of the seal where the folded over part of the wide edge zone 2' rests against the overlapping edge zone 2". The strength and tightness of the seal is improved further in that the inner thermoplastic layer of the narrower edge zone 2" rests against, and is joined to, the opposite laminate edge via the outer thermoplastic layer, not shown in the drawing. Since the doubling of one of the edge zones of the material is performed within the thickness-reduced area, the complete seal will have a thickness which only insignificantly exceeds the original thickness of the laminate.

The method of manufacturing the laminate in accordance with the invention by means of thickness reduction in longitudinal zones whilst the material is still in the form of a raw material web makes it possible, as mentioned before, to manufacture the material at an appreciably higher rate whilst maintaining accuracy, and thus with a higher capacity than previously. The application of the outer thermoplastics after the reduction in thickness moreover eliminates the problem of remaining paper fibres and dust being entrained into the finished packing container, since any residual dust is covered by the thermoplastic layer and is thus rendered harmless.

The asymmetric design of the thickness-reduced edge zones provides optimum facilities for doubling one of the edge zones and forming a liquid-tight overlap seal without the latter acquiring an excessive thickness which might prevent the continued forming of the packing container.

We claim:

1. In the manufacture of a packing laminate in the form of a web having at least a layer of paper as a stiffening material, a method of processing and dividing a web of raw stiffening material comprising the steps of:
   reducing the thickness of the raw material web within longitudinal zones located at regularly spaced intervals over the width of the web by cutting away a portion of the stiffening materials in said zones;
   covering the web of raw material by applying a layer of thermoplastic material which covers said zones and the material situated between said zones; and,
   dividing the web into individual packing material webs by making longitudinal cuts in said zones.

2. A method in accordance with claim 1, wherein said cuts are placed asymmetrically in the zones.

3. A method in accordance with claim 2, characterized in that the cuts divide each of said zones into two edge zones whose mutual width ratio is between 5:1 and 3:2.

4. A method in accordance with claim 1, characterized in that the cuts are placed at mutually equal distances from one another.

5. A method in accordance with claim 1 characterized in that the thermoplastic material is extruded onto the raw material web and laminated to the same to form a liquid-tight layer.

6. A method in accordance with claim 1 wherein said thermoplastic layer is polyethylene.

7. A packing laminate in the form of a web comprising a carrier layer of stiffening material and at least one layer of thermoplastic material laminated to the same, characterized in that the laminate web along its longitudinal edges is provided with edge zones wherein the thickness of the carrier layer is reduced, said edge zones as well as the remaining parts of the carrier layer being covered by the thermoplastic layer.

8. A packing laminate in accordance with claim 7, characterized in that said edge zones are of different widths.

9. A packing laminate in accordance with claim 8, characterized in that the thickness of the laminate within the wider edge zone gradually diminishes from the full material thickness to a minimum thickness which is largely maintained within an area along the longitudinal edge of the web.

10. A packing laminate in accordance with claim 9, characterized in that said area of minimum thickness is of a width which is equal to at least half the width of the edge zone.

11. A packing laminate in accordance with claim 10, characterized in that said longitudinal edge of the web is folded over 180° along a folding line whose location substantially coincides with the center of the area in the edge zone wherein the material thickness is smallest.

* * * * *